US012764434B2

(12) United States Patent
Chishti

(10) Patent No.: US 12,764,434 B2
(45) Date of Patent: Oct. 13, 2026

(54) REPEATER CIRCUITRY FOR MEDICAL IMAGING SYSTEMS AND DEVICES

(71) Applicant: Boston Scientific Scimed, Inc., Maple Grove, MN (US)

(72) Inventor: Zan Syed Chishti, Pepperell, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 121 days.

(21) Appl. No.: 18/981,907

(22) Filed: Dec. 16, 2024

(65) Prior Publication Data

US 2025/0211874 A1 Jun. 26, 2025

Related U.S. Application Data

(60) Provisional application No. 63/612,681, filed on Dec. 20, 2023.

(51) Int. Cl.

| | |
|---|---|
| ***H04N 25/709*** | (2023.01) |
| ***H04N 25/768*** | (2023.01) |
| ***H04N 25/77*** | (2023.01) |

(52) U.S. Cl.
CPC ......... *H04N 25/709* (2023.01); *H04N 25/768* (2023.01); *H04N 25/77* (2023.01)

(58) Field of Classification Search
CPC ..... H04N 25/709; H04N 25/768; H04N 25/77
USPC ........................................................ 375/211
See application file for complete search history.

(56) References Cited

U.S. PATENT DOCUMENTS

2021/0322020 A1* 10/2021 Shelton, IV ..... A61B 1/000094
2023/0421929 A1* 12/2023 Ise ........................ H04N 25/78

OTHER PUBLICATIONS

International Search Report and Written Opinion issued in PCT International Application No. PCT/US2024/060309, mailed Apr. 14, 2025 (9 pages).

* cited by examiner

*Primary Examiner* — Leila Malek
(74) *Attorney, Agent, or Firm* — Bookoff McAndrews, PLLC

(57) ABSTRACT

Disclosed are one or more embodiments for repeater circuitry including timing circuitry configured to generate a control signal, where a state of the control signal drives a first mode of operation or a second mode of operation for the repeater circuitry, switching circuitry configured to cause the repeater circuitry to initially operate in the first mode and transmit an initialization signal generated by a processor to an imaging device while the repeater circuitry is operating in the first mode, and buffer circuitry, where in response to the switching circuitry causing the repeater circuitry to subsequently operate in the second mode based on a change to the state of the control signal, the buffer circuitry is configured to receive and amplify the one or more data signals from the imaging device to generate one or more amplified data signals for transmission to the processor.

20 Claims, 4 Drawing Sheets

REPEATER CIRCUITRY FOR MEDICAL IMAGING SYSTEMS AND DEVICES

CROSS-REFERENCE TO RELATED APPLICATIONS

This application claims the benefit of priority to U.S. Provisional Application No. 63/612,681, filed on Dec. 20, 2023, which is incorporated by reference herein in its entirety.

TECHNICAL FIELD

The disclosure relates generally to repeater circuitry for medical imaging systems and devices and, more particularly, to repeater circuitry for amplifying data signals transmitted between components of the medical imaging systems and devices.

BACKGROUND

Various medical device types may include one or more image sensors at a distal end of the medical device. For example, the medical device may be inserted into and navigated through a body lumen of a patient to a target site during a medical procedure. As the medical device is inserted, the image sensors may capture raw image data of an environment of the body lumen and/or the target site. The image sensors may rely on copper cables or wires for transmission of the raw image data (e.g., in a data signal format) to a processor that is configured to process the raw image data to generate images and/or image streams (e.g., video) to be output for display. As such, the transmitted data signals may be susceptible to signal loss or degradation due to electromagnetic interference (EMI), cable length, and/or other factors that may affect signal quality during transmission.

SUMMARY OF THE DISCLOSURE

In some aspects, the techniques described herein relate to repeater circuitry, including: timing circuitry configured to generate a control signal, a state of the control signal driving a first mode of operation or a second mode of operation for the repeater circuitry; switching circuitry electrically connected to the timing circuitry and configured to: receive the control signal from the timing circuitry; based on the state of the control signal, cause the repeater circuitry to initially operate in the first mode; and transmit an initialization signal generated by and received from a processor to an imaging device while the repeater circuitry is operating in the first mode, wherein the imaging device is configured to generate one or more data signals in response to receiving the initialization signal; and buffer circuitry electrically connected to the switching circuitry, wherein, in response to the switching circuitry causing the repeater circuitry to subsequently operate in the second mode based on a change to the state of the control signal, the buffer circuitry is configured to receive and amplify the one or more data signals from the imaging device to generate one or more amplified data signals for transmission to the processor.

In some aspects, the techniques described herein relate to a repeater circuitry, wherein the switching circuitry is electrically connected to the processor and configured to receive the one or more amplified data signals from the buffer circuitry and transmit the one or more amplified data signals to the processor while the repeater circuitry is operating in the second mode.

In some aspects, the techniques described herein relate to a repeater circuitry, wherein the timing circuitry is further configured to: compare a voltage level associated with a delay signal to a voltage level threshold; and when, based on the comparison, the voltage level associated with the delay signal is equal to or exceeds the voltage level threshold, change the state of the control signal.

In some aspects, the techniques described herein relate to a repeater circuitry, wherein the voltage level threshold is based on a duration of time associated with the transmission of the initialization signal from the processor to the imaging device.

In some aspects, the techniques described herein relate to a repeater circuitry, wherein the voltage level threshold is approximately 1 Volt (V) and the voltage level associated with the delay signal is configured to rise in voltage from approximately 0 V to approximately 3.3 V.

In some aspects, the techniques described herein relate to a repeater circuitry, wherein a duration of time for the voltage level associated with the delay signal to meet or exceed the voltage level threshold ranges from approximately 1 second to approximately 1.2 seconds.

In some aspects, the techniques described herein relate to a repeater circuitry, wherein the comparison is performed by a comparator of the timing circuitry.

In some aspects, the techniques described herein relate to a repeater circuitry, wherein the imaging device is located at a distal end of a medical device.

In some aspects, the techniques described herein relate to a repeater circuitry, wherein the first mode corresponds to a bidirectional mode of operation for data flow between the processor and the imaging device, and the second mode of operation corresponds to a unidirectional mode of operation for data flow from the imaging device to the processor for data transmission.

In some aspects, the techniques described herein relate to a repeater circuitry, wherein in the bidirectional mode: the initialization signal is transmitted from the processor to the switching circuitry along a first data path, and from the switching circuitry to the imaging device along a second data path, and wherein in the unidirectional mode: the one or more data signals are transmitted from the imaging device to the buffer circuitry along a third data path; and the one or more amplified data signals are transmitted from the buffer circuitry to the switching circuitry along a fourth data path, and from the switching circuitry to the processor along the first data path.

In some aspects, the techniques described herein relate to a repeater circuitry, wherein the buffer circuitry is bypassed in the bidirectional mode.

In some aspects, the techniques described herein relate to a repeater circuitry, wherein the imaging device is located in a medical device and the processor is located at an image processing device, the image processing device being separate from the medical device.

In some aspects, the techniques described herein relate to a repeater circuitry, wherein the repeater circuitry is located at a handle of the medical device.

In some aspects, the techniques described herein relate to a repeater circuitry, wherein the repeater circuitry is located at a connector of the medical device, the connector configured to connect the medical device to the image processing device.

In some aspects, the techniques described herein relate to a repeater circuitry, wherein the repeater circuitry is located more proximate to the processor than the imaging device along an electrical transmission path between the imaging device and the processor.

In some aspects, the techniques described herein relate to a medical system, including: a medical device including an imaging device: a processor configured to generate and transmit an initialization signal to the imaging device, wherein the imaging device is configured to generate one or more data signals in response to receiving the initialization signal; and repeater circuitry electrically connected between the processor and the imaging device, the repeater circuitry configured to operate in a first mode or a second mode, the repeater circuitry including: timing circuitry configured to generate a control signal, a state of the control signal driving the first mode or the second mode for the repeater circuitry; switching circuitry electrically connected to the timing circuitry and configured to: receive the control signal from the timing circuitry; based on the state of the control signal, cause the repeater circuitry to initially operate in the first mode; and transmit the initialization signal generated by and received from the processor to the imaging device while the repeater circuitry is operating in the first mode; and buffer circuitry electrically connected to the switching circuitry, wherein, in response to the switching circuitry causing the repeater circuitry to subsequently operate in the second mode based on a change to the state of the control signal, the buffer circuitry is configured to receive and amplify the one or more data signals from the imaging device to generate one or more amplified data signals for transmission to the processor.

In some aspects, the techniques described herein relate to a medical system, wherein the timing circuitry is configured to cause the state of the control signal to change from a low state to a high state based on a comparison of a voltage level associated with a delay signal to a voltage level threshold.

In some aspects, the techniques described herein relate to a medical system, wherein the voltage level threshold is based on a duration of time associated with the transmission of the initialization signal from the processor to the imaging device.

In some aspects, the techniques described herein relate to a method performed by repeater circuitry for amplifying one or more data signals, the method including: transmitting an initialization signal received from a processor to an imaging device in a first mode of operation, wherein the imaging device is configured to generate one or more data signals in response to receiving the initialization signal; comparing a voltage of a delay signal to a voltage level threshold to determine when to change a state of a control signal generated by the repeater circuitry from a low state to a high state; switching a mode of operation of the repeater circuitry from the first mode to a second mode in response to the state of the control signal changing from the low state to the high state based on the comparison; and in the second mode of operation, receiving and amplifying the one or more data signals from the imaging device to generate one or more amplified data signals for transmission to the processor.

In some aspects, the techniques described herein relate to a method, wherein the voltage level threshold is based on a duration of time associated with the transmission of the initialization signal from the processor to the imaging device.

It is to be understood that both the foregoing general description and the following detailed description are exemplary and explanatory only and are not restrictive of the disclosed aspects, as claimed. As used herein, the terms "comprises," "comprising," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." The term "distal" refers to a direction away from an operator/toward a treatment site, and the term "proximal" refers to a direction toward an operator. The term "approximately," or like terms (e.g., "substantially"), includes values +/−10% of a stated value.

BRIEF DESCRIPTION OF THE DRAWINGS

The accompanying drawings, which are incorporated in and constitute a part of this specification, illustrate examples of this disclosure and, together with the description, serve to explain the principles of the disclosure.

DETAILED DESCRIPTION

Figure 1:
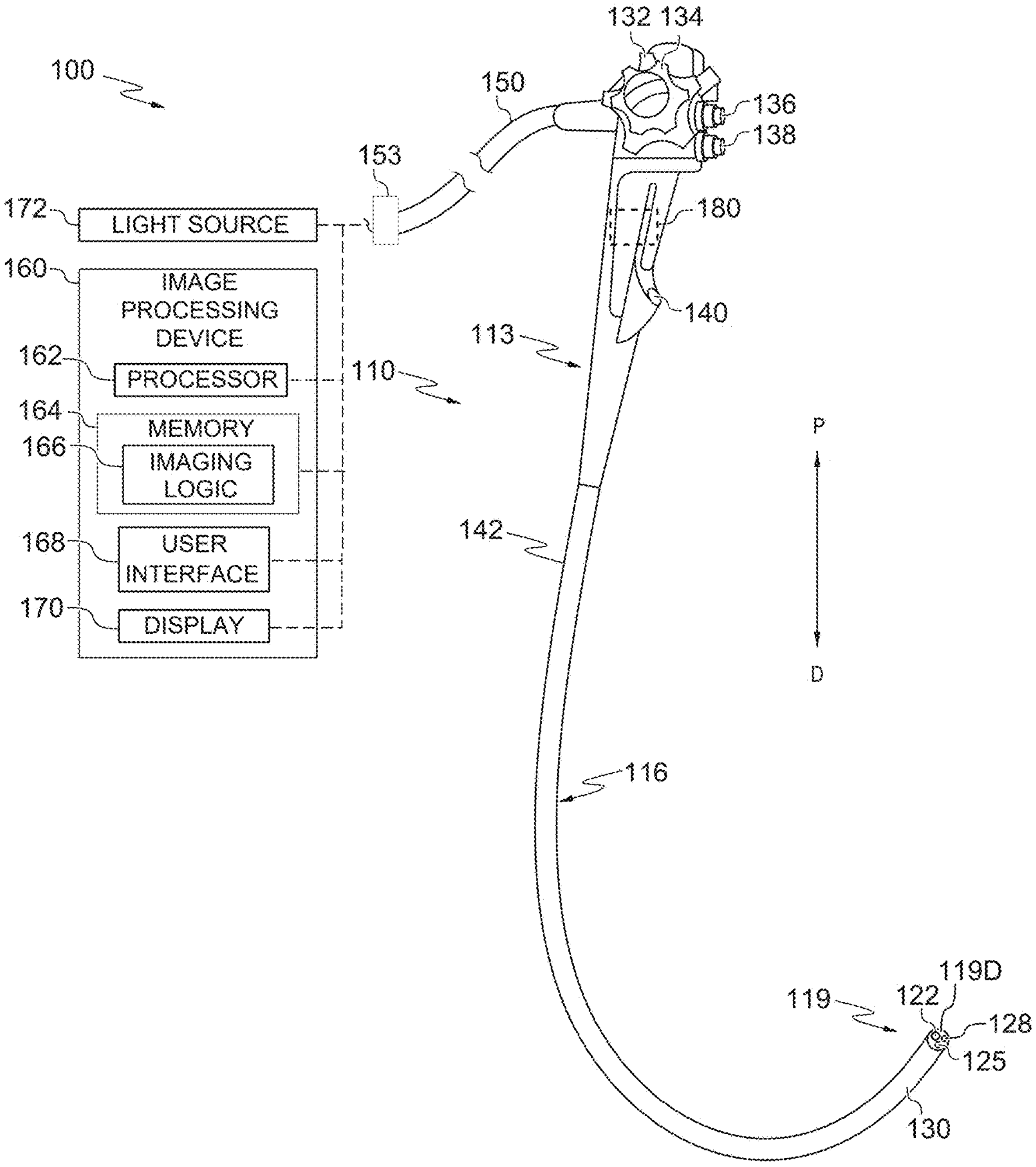
FIG. 1 depicts an exemplary medical system, according to one or more aspects.

Various aspects of this disclosure relate generally to repeater circuitry for medical imaging systems and devices and, more particularly, to repeater circuitry for amplifying data signals transmitted between components of the medical imaging systems and devices.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As briefly mentioned above, some medical devices having an image sensor may rely on copper cables or wires for data transmission between the image sensor and an image processing device. As such, transmitted data signals from the image sensor to the image processing device may be susceptible to signal loss or degradation due to electromagnetic interference (EMI), a length of a cable or wire connecting the image sensor to the image processing device, and/or other factors that may affect signal strength and quality during transmission. In various cases, the data signals generated and transmitted by the image sensor may not be strong enough upon reaching the image processing device due to attenuation and/or other factors.

To provide an illustrative example, an example medical system may include a medical device having an imaging device. The imaging device may include an image sensor located at a distal end of a shaft of the medical device that is inserted into a body lumen of a patient during a medical procedure. The medical system may also include an image processing device. As discussed herein, the image processing device may also be referred to as a controller. The image processing device may be located separately from the medical device. The image processing device and the medical device may be communicatively coupled via an umbilicus of the medical device, which may include various cables, such as coaxial cables that are housed within the umbilicus and extend to the image sensor at the distal end of the shaft of the medical device. The coaxial cables may include copper wires, which can facilitate data transmission between the image sensor and a processor of the image processing device. The processor may be configured to process data signals generated by and received from the image sensor to generate a processed image or image stream (e.g., video) for outputting to a display.

Maintaining signal quality and signal strength of the data signals transmitted from the image sensor to the image processing device helps to ensure an image or image stream of sufficient quality is able to be generated and output for display by the processor for visualization by an operator of the medical device. For example, if the signal strength and/or quality of data signals transmitted to the processor is compromised, no image or image stream may be able to be generated and output for display to the operator of the medical device, or the image or image stream generated and output for display may include artifacts and/or defects such as noise, color shifts, or even loss of visualization.

One example conventional technique for maintaining signal quality and strength of data signals transmitted from the image sensor of the medical device to the processor of the image processing device may include decreasing a length of the cables connecting the image sensor to the processor to decrease a transmission distance (e.g., using a shorter umbilicus). However, using shorter cables may not be desirable based on the impact to maneuverability of the medical device in the operating room. Another example conventional technique for maintaining signal quality and strength may include increasing the diameter of a coaxial cable and/or utilizing different materials for the cable that, for example, are less susceptible to EMI noise. However, increasing the diameter of the cable (e.g., increasing diameter of a coaxial cable) may also not be desirable as a larger diameter may cause compatibility issues with certain medical devices and/or image processing devices. Additionally, a cable with a larger diameter may require larger connectors, incur increased cost, and create other undesired limitations. Further, a cable with a larger diameter may also impact maneuverability within a patient's body due to an insertion portion having to be larger to accommodate the larger cable diameter. Using coaxial cables comprised of more robust material that may be less susceptible to EMI noise may increase overall costs of the medical devices.

Therefore, aspects of this disclosure are directed to repeater circuitry for medical imaging systems and devices to help maintain signal quality and strength of data signals transmitted between components of the medical imaging systems and devices. Specifically, the repeater circuitry may amplify one or more data signals generated by the imaging device for transmission to the processor. The repeater circuitry may include a plurality of components, such as timing circuitry, switching circuitry, and/or buffer circuitry. The timing circuitry may be configured to generate a control signal, where a state of the control signal may drive an operating mode of the repeater circuitry. For example, the switching circuitry may be electrically connected to the timing circuitry and configured to receive the control signal from the timing circuitry. Based on the state of the control signal, the switching circuitry may cause the repeater circuitry to operate in either a first mode or a second mode of operation. When the repeater circuitry is operating in the first mode, the switching circuitry may be configured to transmit an initialization signal generated by and received from the processor to the imaging device, where the imaging device may be configured to generate one or more data signals (e.g., raw image data captured by the imaging device) in response to receiving the initialization signal. The buffer circuitry may be electrically connected to the switching circuitry and, when the repeater circuitry is operating in the second mode, the buffer circuitry may be configured to receive and amplify the one or more data signals from the imaging device to generate one or more amplified data signals for transmission to the processor via the switching circuitry.

The repeater circuitry as disclosed herein may be configured to amplify (e.g., enhance and/or strengthen) data signals generated by the imaging device of the medical device. The repeater circuitry may further be configured to transmit the amplified data signals to the processor for processing to generate processed images and/or image streams (e.g., video) for outputting to one or more displays of the medical system. Use of the repeater circuitry to amplify the data signals may help to ensure quality image and/or images streams may be capable of being generated and displayed without having to use a shortened umbilicus and/or cables of a different material or diameter. Further, the footprint of the repeater circuitry may be compact enough to be located within a handle of a medical device and within proximity to the processor, among other locations, which enables the repeater circuitry to be included within the medical device and also used with a wide array of medical devices and image processing devices.

Referring now to the drawings, FIG. 1 depicts an exemplary medical system 100, according to one or more aspects. The medical system 100 may include a medical device 110 and an image processing device 160. The medical device 110 may be used to perform a diagnostic and/or interventional medical procedure on a patient, hereinafter referred to as a medical procedure for brevity. The medical device 110 may be an endoscope or other type of scope, such as a bronchoscope, ureteroscope, duodenoscope, gastroscope, endoscopic ultrasonography ("EUS") scope, colonoscope, laparoscope, arthroscope, cystoscope, aspiration scope, sheath, or catheter, among other examples. The medical device 110 may include a handle 113 and an insertion portion 116 (e.g., a shaft or a catheter). An umbilicus 150 may extend from a proximal portion of the handle 113. The insertion portion 116 may be connected to and extend from a distal portion of the handle 113. The insertion portion 116 may terminate distally in a distal tip 119 at a distal end portion 130 of the insertion portion 116.

As discussed in detail below, a distal face 119D of the distal tip 119 may include one or more distal openings 122 (e.g., distal openings of working channels or lumens). Moreover, in some aspects, the distal face 119D includes an imaging device 125 and/or an illumination device 128. While only one imaging device 125 and illumination device 128 are depicted in FIG. 1, other example medical devices may include a plurality of imaging devices and/or illumination devices. The imaging device 125 may include one or more cameras, one or more image sensors, one or more endoscopic viewing elements, or one or more optical assemblies including one or more image sensors and one or more lenses, among other similar devices. The illumination device 128 may include one or more LEDs, incandescent light sources, optical fibers, and/or other illuminators. In some examples, a source supplying light to be emitted via the illumination device 128 may be located at the distal end portion 130 of the medical device 110. In other examples, the source supplying the light may be a separate device (e.g., light source 172) or may be integrated with the image processing device 160. As depicted in FIG. 1, the imaging device 125 and/or the illumination device 128 may be disposed on the distal face 119D of the distal tip 119. Additionally or alternatively, the imaging device 125 and/or the illumination device 128 may be disposed on a side surface of the distal end portion 130, for example, at or adjacent to the distal tip 119. In further examples, the imaging device 125 and/or the illumination device 128 may be disposed anywhere along a length of the insertion portion 116 and/or the distal end portion 130. The distal tip 119 may also include one or more components to help dissipate or otherwise direct heat, for example, heat generated by illumination device(s) (e.g., LEDs) 128, and/or one or more components for suction, irrigation, insufflation, accessory devices, etc. In some examples, the distal tip 119 may further include one or more end effectors (e.g., graspers, electrodes, biopsy devices, etc.).

The handle 113 may include one or more actuators, for example, a first actuator 132 and/or a second actuator 134. The first actuator 132 and/or the second actuator 134 may include, for example, rotatable knobs that rotate to push/pull one or more elements (e.g., steering/articulation wires or cables) that extend through one or more portions of the insertion portion 116 and connect to the distal end portion 130 of the insertion portion 116. For example, the first actuator 132 and/or the second actuator 134 may be configured to rotate about a respective axis to push/pull actuating elements (e.g., wires or cables) that extend within one or more lumens of the insertion portion 116. Rotation of the first actuator 132 and/or the second actuator 134 may cause a portion of the insertion portion 116 (e.g., the distal end portion 130) to bend, for example, via an articulating joint (not shown). Additionally or alternatively, the handle 113 may include one or more additional actuators (e.g., buttons, knobs, levers, locks, etc.) to, for example, limit movement of the first actuator 132 and/or the second actuator 134, close or open an end effector, rotate an end effector about a longitudinal axis, raise or lower an elevator to move a device delivered through the working channel, capture an image and/or image stream (e.g., video), and/or provide other functionality to an end effector and/or the distal tip 119.

The handle 113 may also include one or more valves, for example, a first valve 136 and a second valve 138. Although two valves (i.e., the first valve 136 and the second valve 138) are shown, the handle 113 may include additional (e.g., a third valve, a fourth valve, etc.) or fewer valves (e.g., no valves or only the first valve 136). In some aspects, the first valve 136 may be configured to control the supply of air and/or water to the distal tip 119. The second valve 138 may be configured to control the application of suction to the distal tip 119. Additional valves may be used, for example, to control the application of one or more medicines, agents, materials, etc. from the distal tip 119.

The handle 113 may also include a port or proximal opening 140, which may be fluidly connected to one or more lumens or working channel of the insertion portion 116. For example, a medical instrument (not shown) may be inserted into the proximal opening 140 and may be extended to and/or distally from the distal tip 119 via the one or more lumens. The distal opening 122 on the distal face 119D of the distal tip 119, which may be a distal most end of the distal end portion 130, may be distal openings of the one or more lumens. The distal opening 122 may be fluidly coupled to the proximal opening 140 of the handle 113 such that a medical instrument inserted into the proximal opening 140 may be extended distally to the distal opening 122. In some aspects, the medical instrument may be extended distally from the distal opening 122, for example, distal of the distal tip 119. Additionally or alternatively, one or more materials (e.g., liquids, gels, gasses, patches, powders, etc.) may be supplied to a target site via the distal opening 122. Additionally or alternatively, suction may be applied to the target site from the distal opening 122 (e.g., via the proximal opening 140), for example, to remove fluid and/or debris from the target site.

One or more portions of the insertion portion 116 may be flexible and may be formed of any medical grade material suitable for accessing a tortuous path within the body. The rigidity/flexibility of the insertion portion 116 is not limited. In some aspects, the rigidity/flexibility of the insertion portion 116 may vary, for example, along a longitudinal length of the insertion portion 116. A longitudinal length of the insertion portion 116 may vary and is not limited. For example, the insertion portion 116 may have a length of approximately 5-100 inches, for example, between 10-70 inches. Furthermore, an outer diameter of the insertion portion 116 is not limited. For example, the outer diameter of insertion portion 116 may be approximately 0.07-0.60 inches, for example, between 0.10-0.50 inches. In some embodiments, the outer diameter of insertion portion 116 may vary along the longitudinal length. For example, the outer diameter of a proximal portion 142 of the insertion portion 116 may be less than or greater than the outer diameter of the distal end portion 130 of the insertion portion 116, or vice versa.

A cross-section of the insertion portion 116 and/or the distal tip 119 may be generally circular, ovular, or any other shape commonly used in the art for the insertion portion of a medical device. In other examples, the cross-section of insertion portion the 116 and/or the distal tip 119 may be square, rectangular, hexagonal, polygonal, or any other shape. In some examples, the insertion portion 116 may have a different cross-sectional shape than the distal tip 119. For example, the insertion portion 116 may have a circular cross-sectional shape, and the distal tip 119 may have a hexagonal cross-sectional shape, or vice versa. The size and shape of the insertion portion 116 and/or the distal tip 119 are not limited to the size and/or shapes described herein and may be any other shape commonly used in the art.

As mentioned above, although not shown, the distal end portion 130 may include one or more articulation joints configured to articulate the distal tip 119 in one or more directions (e.g., left, right, up, down, etc.). Although not shown, the distal end portion 130 may further include one or more treatment or accessory devices (e.g., laser fibers, elevators, etc.), and/or one or more other devices to otherwise image, view, or otherwise treat a target site.

The umbilicus 150 may be removably coupled (e.g., directly or indirectly) to the image processing device 160 via a connector 153. The connector 153 may facilitate connection between the umbilicus 150 and the image processing device 160. The umbilicus 150 may include a coaxial cable and other types of cables used in the art suitable for data transmission. For example, in some aspects, the umbilicus 150 may include a fiber optic cable instead of a coaxial cable for data transmission. The image processing device 160 may be configured to process information (e.g., sensor data, imaging data, light data, etc.) received from the medical device 110. In some aspects, the image processing device 160 may be a controller associated with the medical device

110. The imaging device 125 and/or the illumination device 128 may be electrically coupled (e.g., directly or indirectly) to the image processing device 160, for example, via one or more wires and/or cables extending through insertion portion 116, through the handle 113, and through the umbilicus 150. For example, the wires and/or cables extending through the insertion portion 116 and the umbilicus 150 may include one or more coaxial cables or fiber optic cables for coupling the image processing device 160 to at least the imaging device 125 via, e.g., the connector 153.

The image processing device 160 may be communicatively coupled to the medical device 110 by, for example, a wired connection via the umbilicus 150 or a wireless connection, and the like. As described herein, wireless communication protocols used for wireless communication between any two or more components may include one or more wireless communication protocols such as, for example, cellular, Wi-Fi®, Bluetooth®, Z-Wave®, ZigBee, near-field communication (NFC), or other wireless communication protocols. In various aspects, the image processing device 160 may be a computer system incorporating a plurality of hardware components that allow the image processing device 160 to receive data (e.g., image sensor data from the imaging device 125), process information (e.g., intensity, motion, or spectral data and the like), and/or generate a processed image or a video image stream for outputting to an operator of the medical system 100 based on data received from the imaging device 125. Illustrative hardware components of the image processing device 160 may include at least one processor 162, at least one memory 164, at least one user interface 168, and at least one display 170.

The processor 162 of the image processing device 160 may include any computing device capable of executing machine-readable instructions, which may be stored on a non-transitory computer-readable medium, for example, the memory 164 of the image processing device 160. By way of example, the processor 162 may include a controller, an integrated circuit, a microchip, a computer, and/or any other computer processing unit operable to perform calculations and logic operations required to execute a program. As one non-limiting example, the processor 162 may be a bridge processor chip (BPC). As described in greater detail herein, the processor 162 may be configured to perform one or more operations in accordance with the instructions stored on the memory 164.

The memory 164 of the image processing device 160 may include a non-transitory computer readable medium that stores machine-readable instructions thereon, for example, an imaging logic 166. The imaging logic 166 may include executable instructions or algorithms that allow the medical system 100 to capture digital images (e.g., raw digital images) by activating one or more components of the medical device 110, for example, the imaging device 125 to capture the digital images and/or the illumination device 128 to provide illumination in order to enhance visualization of objects or features captured in the digital images. The imaging logic 166 may also include instructions for processing signals sent by and received from the imaging device 125 to process raw image data into images and/or video image streams.

It should be understood that various programming algorithms and data that support an operation of the medical system 100 may reside in whole or in part in the memory 164. The memory 164 may include any type of computer readable medium suitable for storing data and algorithms, such as, for example, random access memory (RAM), read only memory (ROM), a flash memory, a hard drive, and/or any device capable of storing machine-readable instructions. The memory 164 may include one or more data sets, including, but not limited to, image data from one or more components of the medical system 100 (e.g., the medical device 110).

The display 170 of the medical system 100 may be communicatively coupled to the processor 162 of the image processing device 160. The processor 162 may be operable to transmit processed image and/or image stream (e.g., video) data to the display 170 for viewing by a user of the medical system 100. In various aspects, the image processing device 160 may be configured to receive operator inputs to initiate operation of the imaging device 125, for example, from the user interface 168 of the image processing device 160. It should be appreciated that, in some aspects, the user interface 168 may be a device integral with the image processing device 160, and in other aspects, the user interface 168 may be a remote device in communication (e.g., wireless, wired, etc.) with the image processing device 160, including switches, buttons, or other inputs on the medical device 110.

Still referring to FIG. 1, repeater circuitry 180 may be located at the handle 113 of the medical device 110. For example, the repeater circuitry 180 may be disposed inside the handle 113 and electrically connected between the image processing device 160 and the imaging device 125. For example, the repeater circuitry 180 may be electrically coupled (e.g., directly or indirectly) to the image processing device 160 and to the imaging device 125. Particularly, the repeater circuitry 180 may be electrically connected to the processor 162. While processor 162 is depicted as an integrated component of image processing device 160 in FIG. 1, it should be noted that the location of the processor 162 is not limited thereto, and the processor 162 may be located separately from the image processing device 160. For example, the processor 162 may be located at the handle 113 in some aspects.

Although illustrated as a component located at the handle 113 in FIG. 1, the repeater circuitry 180 may alternatively be located at different locations. As one example, the repeater circuitry 180 may be located at the connector 153. As another example, the repeater circuitry 180 may be located at the image processing device 160. Generally, the repeater circuitry 180 may be electrically connected more proximate (closer) to the processor 162 than the imaging device 125. That is, along an electrical transmission path between the imaging device 125, the repeater circuitry 180, and the processor 162, the repeater circuitry 180 may be located closer to the processor 162 along that transmission path than to the imaging device 125.

The repeater circuitry 180 may be configured to amplify one or more data signals generated by the imaging device 125. For example, the processor 162 may be configured to automatically send an initialization signal to the imaging device 125 in response to the connection of the medical device 110 to the processor 162. Additionally and/or alternatively, the processor 162 may be configured to send an initialization signal to the imaging device 125 based on a command by an operator via the user interface 168. The initialization signal may contain initialization parameters for the imaging device 125 to initiate one or more programmed operations (e.g., to initiate capturing of raw image data). Upon receiving the initialization signal, the imaging device 125 may be configured and operable to capture a raw image (e.g., a digital image) of a surrounding environment of the distal tip 119 of the insertion portion 116, and generate and transmit one or more corresponding data signals. The repeater circuitry 180 may be configured to receive the one or more data signals, and amplify the one or more data signals to generate one or more amplified data signals. The repeater circuitry 180 may further be configured to transmit the one or more amplified data signals to the processor 162 of the image processing device 160. Upon receiving the one or more amplified data signals, the processor 162 may be configured to process the one or more amplified data signals to generate a processed image or image stream (e.g., video) for outputting to the operator of the medical system 100 via the display 170 or other external displays communicatively coupled to the image processing device 160. The components of the repeater circuitry 180 and further operations handled by the repeater circuitry 180 are described in greater detail with respect to the later figures below.

Figure 2:
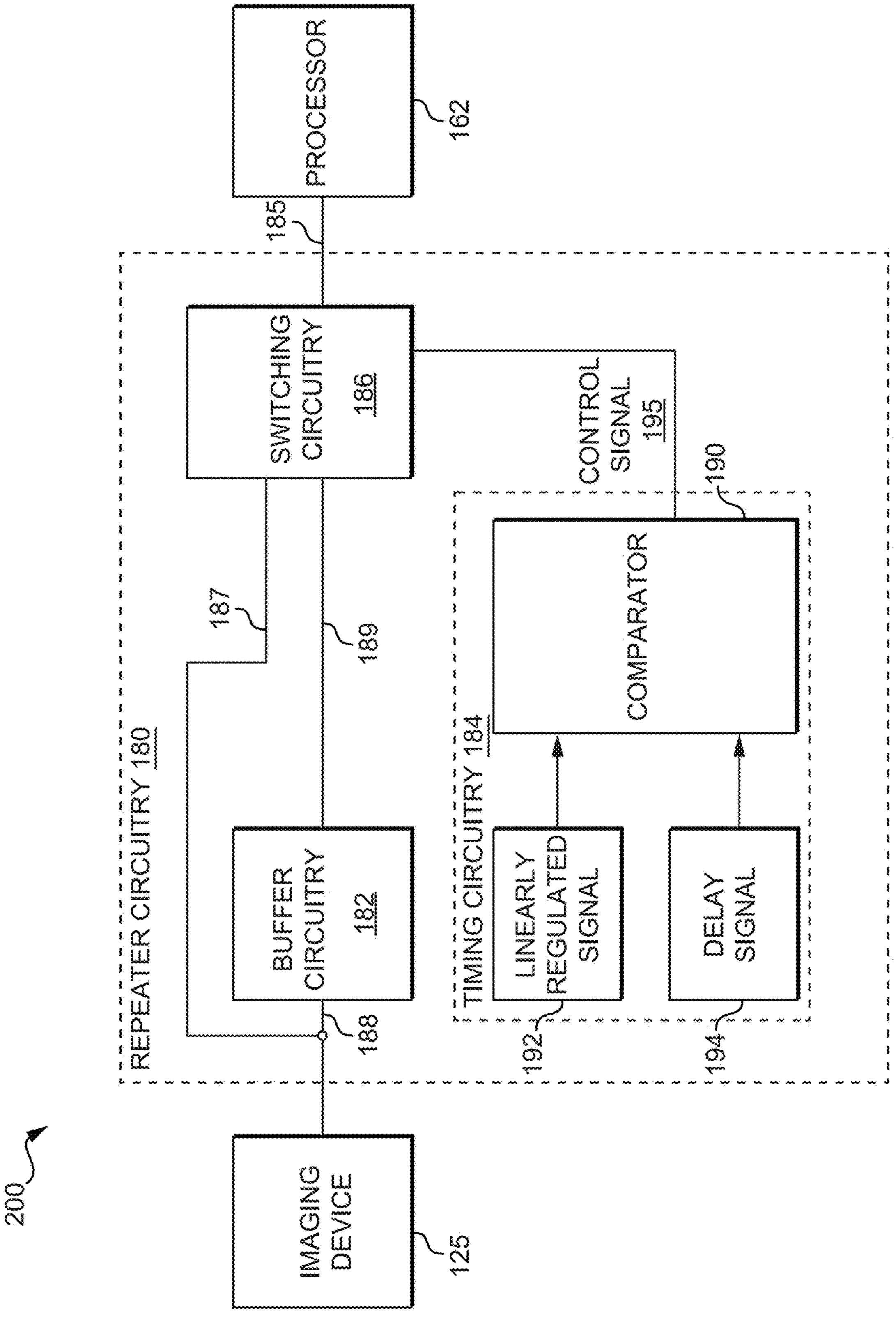
FIG. 2 depicts an electrical schematic of connected components associated with the medical system depicted in FIG. 1, according to one or more aspects.

FIG. 2 depicts an electrical schematic 200 of connected components associated with the medical system 100 depicted in FIG. 1, according to one or more aspects. The electrical schematic 200 shows the connections between the imaging device 125, the repeater circuitry 180, and the processor 162, which are components of the medical system 100 depicted in FIG. 1. The repeater circuitry 180 may be electrically connected to at least the imaging device 125 and the processor 162.

The repeater circuitry 180 may include a plurality of components. Example components may include buffer circuitry 182, timing circuitry 184, and switching circuitry 186. Each of these components may be configured to perform one or more operations that are associated with and/or enabling the amplifying of one or more data signals generated by the imaging device 125 for transmission to the processor 162.

The switching circuitry 186 may be communicatively and electrically connected to the processor 162 and the imaging device 125. The switching circuitry 186 may be configured to facilitate data flow between the processor 162 and the imaging device 125 in various modes. For example, the switching circuitry 186 may cause the repeater circuitry 180 to switch between at least two modes of operation corresponding to a first mode of operation and a second mode of operation. The operational mode switch made by the switching circuitry 186 may be based on a state of a control signal 195 generated by and received from the timing circuitry 184. Description of the timing circuitry 184 is discussed in greater detail in the following paragraphs. The switching circuitry 186 may contain various transistors such as metal-oxide-semiconductor field-effect transistors (MOSFETs) or other types of transistors.

The first mode of operation may be a bidirectional mode of operation, and the second mode of operation may be a unidirectional mode of operation, or vice versa. In the bidirectional mode of operation, the switching circuitry 186 may support data flow between the processor 162 and the imaging device 125. For example, in the bidirectional mode, data received from the processor 162 at the switching circuitry 186 via a first data path 185, may flow from the switching circuitry 186 to the imaging device 125 along a second data path 187 in a first direction. Additionally, in the bidirectional mode of operation, the switching circuitry 186 may support data flow from the imaging device 125 to the switching circuitry 186 along the second data path 187 in a second direction opposite the first direction. The switching circuitry 186 may then transmit the data to the processor 162 via the first data path 185. In other words, in the bidirectional mode of operation, data may flow in both first and second directions between the switching circuitry 186 and the imaging device 125 along the second data path 187. In the unidirectional mode of operation, the switching circuitry 186 may support data flow from the imaging device 125 to the processor 162 by diverting data received from the imaging device 125 along a third data path 188, different from the second data path 187, to buffer circuitry 182. For example, in the unidirectional mode, the data may flow from the imaging device 125 to the buffer circuitry 182 via the third data path 188, from the buffer circuitry 182 to the switching circuitry 186 via a fourth data path 189, and from the switching circuitry 186 to the processor 162 via the first data path 185. It should be noted that buffer circuitry 182 is bypassed in the bidirectional mode of operation. Once the repeater circuitry 180 is operative in the unidirectional mode, the processor 162 may be prevented from transmitting further signals through the second data path 187 to the imaging device 125. For example, once the initialization signal is sent from the processor 162 to the imaging device 125 and the repeater circuitry 180 switches to operating in the unidirectional mode from the bidirectional mode, the processor 162 may not send any further signals to the imaging device 125. The bidirectional and the unidirectional mode of operation are discussed in greater detail with respect to the timing circuitry 184 described below.

The timing circuitry 184 may be communicatively and electrically connected to the switching circuitry 186. The timing circuitry 184 may be configured to generate the control signal 195 for transmission to the switching circuitry 186, where a state of the control signal 195 may drive whether the repeater circuitry 180 (as controlled by the switching circuitry 186) is operative in the first mode or the second mode of operation, as discussed above. For example, if the control signal 195 generated by the timing circuitry 184 is in a low state (e.g., corresponding to 0 V), the switching circuitry 186 may cause the repeater circuitry 180 to operate in the bidirectional mode of operation. When the control signal 195 output by the timing circuitry 184 and received by the switching circuitry 186 is changed from the low state to a high state (e.g., to a predetermined voltage greater than 0 V), the switching circuitry 186 may cause the repeater circuitry 180 to operate in the unidirectional mode of operation.

The timing circuitry 184 may be configured to control the state (e.g., low or high state) of the control signal 195 as part of the generation of the control signal 195. For example, the control signal 195 may be generated upon electrical and/or data connection of the medical device 110 to the image processing device 160. Upon electrical and/or data connection, the timing circuitry 184 may generate the control signal 195 such that the control signal 195 initially has a low state (e.g., 0 V). Receipt of the control signal 195 in the low state may cause the switching circuitry 186 to operate the repeater circuitry 180 in the bidirectional mode of operation. In the bidirectional mode of operation, the switching circuitry 186 may be configured to transmit an initialization signal generated by the processor 162 to the imaging device 125. For example, the switching circuitry 186 may receive the initialization signal from the processor 162 via the first data path 185, and transmit the initialization signal to the imaging device 125 along the second data path 187 in the first direction. As discussed above in connection with the imaging device 125 in FIG. 1, the initialization signal generated by the processor 162 may contain initialization parameters for the imaging device 125 to initiate one or more programmed operations. For example, upon receiving the initialization signal, the imaging device 125 may begin to capture a raw image (e.g., a digital image) of a surrounding environment of the distal tip 119 of the insertion portion 116. The imaging device 125 may further be configured to generate one or more data signals corresponding to the captures of the raw images of the surrounding environment.

If the repeater circuitry 180 continues to operate in the bidirectional mode, the generated data signals may then be configured to flow from the imaging device 125 to the switching circuitry 186 via the second data path 187 (e.g., in the second direction), and from the switching circuitry 186 to the processor 162 via the first data path 185. In the bidirectional mode, the buffer circuitry 182 configured to amplify the generated data signals, as described in more detail below, may be bypassed. Resultantly, without such amplification, upon reaching the processor 162 for processing, the generated data signals may be too weak due to signal degradation and/or attenuation to enable images and/or image streams to be generated and output for display (e.g., no video may be displayed).

Therefore, in order to amplify the one or more data signals that are generated by the imaging device 125, and to transmit the one or more amplified data signals back to the processor 162 for processing, the repeater circuitry 180 may need to be operating in the unidirectional mode of operation. The switching circuitry 186 may be configured to switch the repeater circuitry 180 from operating in the bidirectional mode to the unidirectional mode in response to the control signal 195 generated by the timing circuitry 184 and received by the switching circuitry 186 changing from a low state to a high state.

A duration of time that the timing circuitry 184 maintains the low state for the control signal 195 may be associated with or based on a duration of time for transmission of the initialization signal generated by the processor 162 to the imaging device 125. The duration of time may be dependent upon how long this initialization process may take. In some aspects, the duration of time may be dependent on specifications of the processor 162. In one example, this duration may span approximately 1 second to 1.2 seconds. However, other durations are contemplated by this disclosure, and this duration may be affected by a distance between the processor 162 and the imaging device 125, a type of electrical connection established between the processor 162 and the imaging device 125, and/or other electrical properties of the medical device 110 and/or the image processing device 160, among other factors.

The timing circuitry 184 may employ logic circuitry to compare a voltage of a delay signal 194 to a predetermined voltage threshold to determine when to change the control signal 195 from the low state to the high state. For example, the timing circuitry 184 may use a comparator 190 to compare a voltage of the delay signal 194 (e.g., resistor-capacitor (RC) delay signal) to a voltage of a linearly regulated signal 192, which may correspond to the predetermined voltage threshold. The control signal 195 generated and output by the timing circuitry 184 may be changed from the low state to the high state based on the voltage of the delay signal 194 meeting or exceeding the voltage of the linearly regulated signal 192. The delay signal 194 may be adjusted (e.g., by changing the RC combination) to rise in voltage levels at a faster or slower pace to meet the predetermined voltage threshold of the linearly regulated signal 192.

The delay signal 194 may correspond to a RC combination connected to a voltage supply (e.g., 3.3 V supply) to ensure that the control signal 195 may change to a high state after the voltage level of the delay signal 194 meets the predetermined voltage threshold. The linearly regulated signal 192 may be generated through a linear regulator integrated circuit (IC) powered through the voltage supply (e.g., 3.3 V supply), which may be connected to the repeater circuitry 180 with a combination of resistors for generating the linearly regulated signal 192. The voltage supply (e.g., 3.3 V supply) may be provided by the image processing device 160 or a controller associated with or including the image processing device 160.

The following describes one exemplary scenario of how the timing circuitry 184 determines when to change the control signal 195 from the low state to the high state. The linearly regulated signal 192 may correspond to a predetermined voltage threshold of 1 Volt (V). Upon electrical and/or data connection between the processor 162 and the imaging device 125, the delay signal 194 may start out at 0 V and slowly increase up to 3.3 V. The delay signal 194 may linearly increase from 0 V to 3.3 V, and upon reaching approximately 1 V (e.g., corresponding to the 1 V predetermined voltage threshold), the timing circuitry 184 may change the control signal 195 from the low state to the high state. The predetermined voltage threshold may be set as 1 V because the duration of time it takes for the delay signal 194 to reach 1 V may correspond to approximately 1 second to approximately 1.2 seconds. This duration of time would allow the initialization signal generated by the processor 162 to reach the imaging device 125 and for the imaging device 125 to begin capturing image data of a surrounding environment of the distal tip 119 of the insertion portion 116. If the duration of time it would take for the initialization signal generated by the processor 162 to reach the imaging device 125 exceeds or is less than approximately 1 to 1.2 seconds, the predetermined voltage level threshold may be adjusted accordingly. The adjustment may be further based on and/or consider the rate at which the voltage of the delay signal 194 may rise. It is important to enable sufficient time for the initialization signal generated by the processor 162 to reach the imaging device 125 before the control signal 195 is changed from the low state to the high state. For example, the imaging device 125 should receive the initialization signal from the processor 162 via the second data path 187 as the repeater circuitry is operating in the bidirectional mode of operation (e.g., before the control signal 195 is changed from the low state to the high state). This may ensure proper communication between the processor 162 and the imaging device 125, and enable a raw image to be transmitted back to the processor 162 from the imaging device 125.

Once the timing circuitry 184 changes the control signal 195 from the low state to the high state, the switching circuitry 186 may be configured to switch the repeater circuitry 180 from operating in the bidirectional mode of operation to the unidirectional mode of operation. In the unidirectional mode of operation, the one or more data signals generated by the imaging device 125 (e.g., corresponding to the raw images captured by the imaging device 125) may be transmitted to the buffer circuitry 182 along the third data path 188. The buffer circuitry 182 may contain various circuit components as known in the art that may be used to amplify data signals. For example, the buffer circuitry 182 may contain various operational amplifiers, transistors, resistors, capacitors, inductors, and/or diodes that may facilitate strengthening the one or more data signals generated by the imaging device 125. As such, the buffer circuitry 182 may be configured to generate one or more amplified data signals upon receipt of the one or more data signals transmitted by the imaging device 125. The buffer circuitry 182 may further be configured to transmit the one or more amplified data signals to the switching circuitry 186 via the fourth data path 189, and the switching circuitry 186 may be configured to transmit the one or more amplified data signals back to the processor 162 via the first data path 185. Once the one or more amplified data signals are transmitted back to the processor 162, the amplified data signals may be processed to generate a processed image or image stream (e.g., video) for outputting to an operator of the medical system 100 via the display 170 or other external displays communicatively coupled to the image processing device 160.

Figure 3:
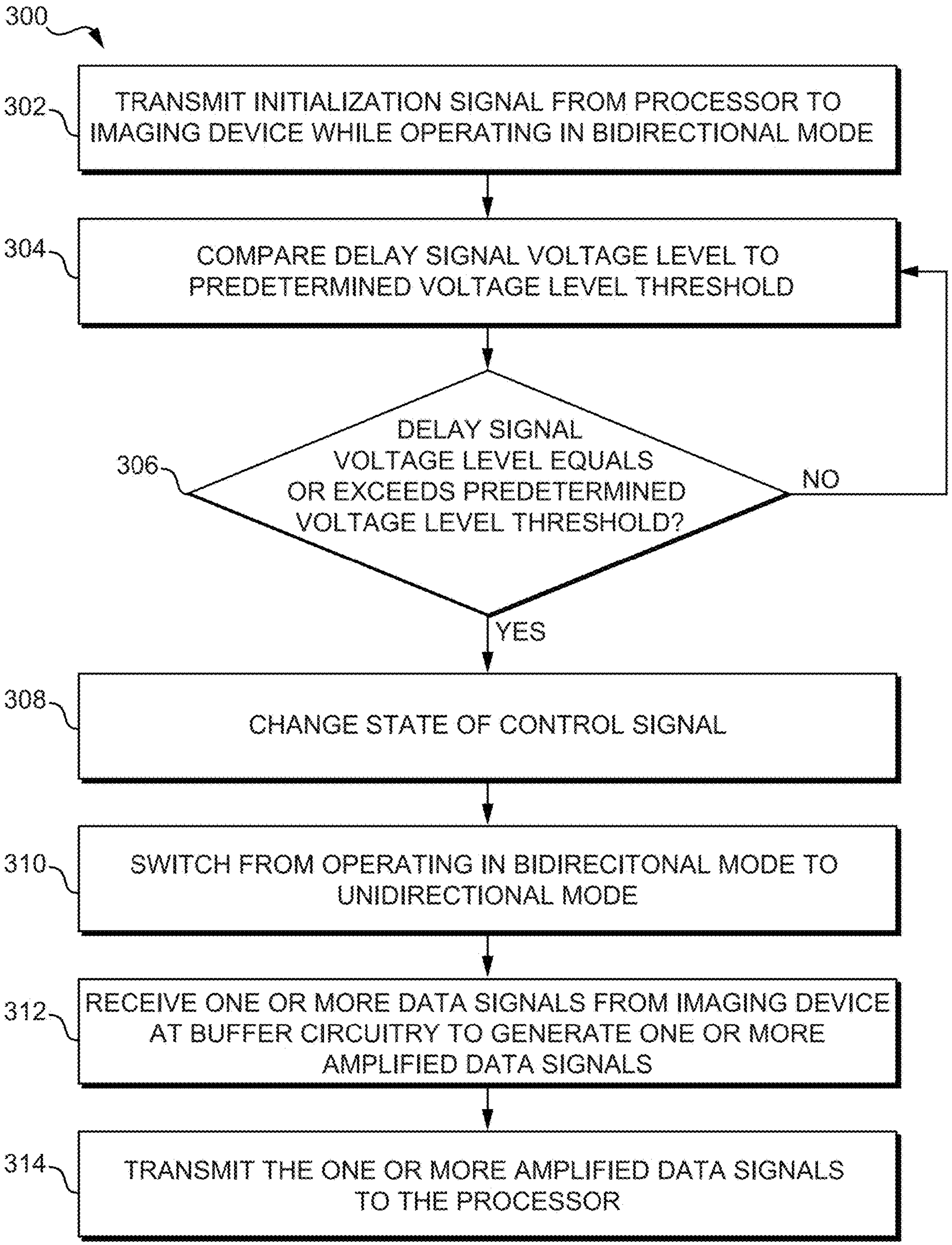
FIG. 3 depicts an exemplary method for generating one or more amplified data signals, according to one or more aspects.

FIG. 3 depicts an exemplary method 300 for generating one or more amplified data signals, according to one or more aspects. The method 300 is described with respect to the components of the medical system 100, such as the repeater circuitry 180, the imaging device 125, and the image processing device 160. In this respect, the method 300 is compatible with the medical system 100 and with the electrical schematic 200 depicted in FIGS. 1 and 2, respectively. In some examples, one or more steps of the method 300 may be performed by the repeater circuitry 180.

Beginning with step 302, the repeater circuitry 180 may transmit an initialization signal from the processor 162 to the imaging device 125 while operating in the bidirectional mode. For example, the initialization signal may be received from the processor 162 at the switching circuitry 186 via the first data path 185 and transmitted from the switching circuitry 186 to the imaging device 125 along the second data path 187. As discussed above in detail with respect to FIG. 2, the repeater circuitry 180 (controlled by the switching circuitry 186) may be configured to operate in the bidirectional mode of operation upon an electrical and/or data connection between the imaging device 125 and the processor 162 based on the control signal 195 received by the switching circuitry 186 from the timing circuitry 184 being in a low state (e.g., corresponding to 0 V). Upon receipt of the initialization signal, the imaging device 125 may be configured to capture a raw image (e.g., a digital image) of a surrounding environment of the distal tip 119 of the insertion portion 116. The imaging device 125 may further be configured to generate one or more data signals corresponding to the captures of the raw images of the surrounding environment.

At steps 304-308, the timing circuitry 184 of the repeater circuitry 180 may be configured to perform various operations to determine when to change the state of the control signal 195 that is generated and output by the timing circuitry 184 to the switching circuitry 186 from the low state to the high state. For example, at step 304, the timing circuitry 184 may compare a voltage level of the delay signal 194 to a predetermined voltage level threshold (e.g., to a voltage level of the linearly regulated signal 192), as described in detail with reference to FIG. 2.

At step 306, if the voltage level of the delay signal 194 does not equal or exceed the predetermined voltage level threshold, the method 300 may return to step 304. A comparison loop may be performed until the voltage level of the delay signal 194 is equal to or greater than the predetermined voltage level threshold. At step 308, the timing circuitry 184 may be configured to change the state of the control signal 195 from the low state to the high state in response to the voltage level of the delay signal 194 being equal to or greater than the predetermined voltage level threshold.

At step 310, the switching circuitry 186 may be configured to switch a data flow mode of the repeater circuitry 180 from the bidirectional mode to the unidirectional mode in response to the state of the control signal 195 output by the timing circuitry 184 and received by the switching circuitry being changed from the low state to the high state. At step 312, while the repeater circuitry 180 is operating in the unidirectional mode of operation, the buffer circuitry 182 may receive one or more data signals (e.g., corresponding to the captures of the raw images of the surrounding environment) from the imaging device 125 along the third data path 188. The buffer circuitry 182 may be configured amplify the one or more data signals to generate one or more amplified data signals.

At step 314, the buffer circuitry 182 may be further configured to transmit the one or more amplified data signals to the processor 162 via the switching circuitry 186. For example, the one or more amplified data signals may be transmitted from the buffer circuitry 182 to the switching circuitry 186 along the fourth data path 189, and from the switching circuitry 186 to the processor 162 along the first data path 185. Once the one or more amplified data signals are transmitted back to the processor 162, the image processing device 160 may be configured process the amplified data signals to generate a processed image or image stream (e.g., video) for outputting to a user of the medical system 100 via the display 170 or other connectable external displays communicatively coupled to the image processing device 160.

Figure 4:
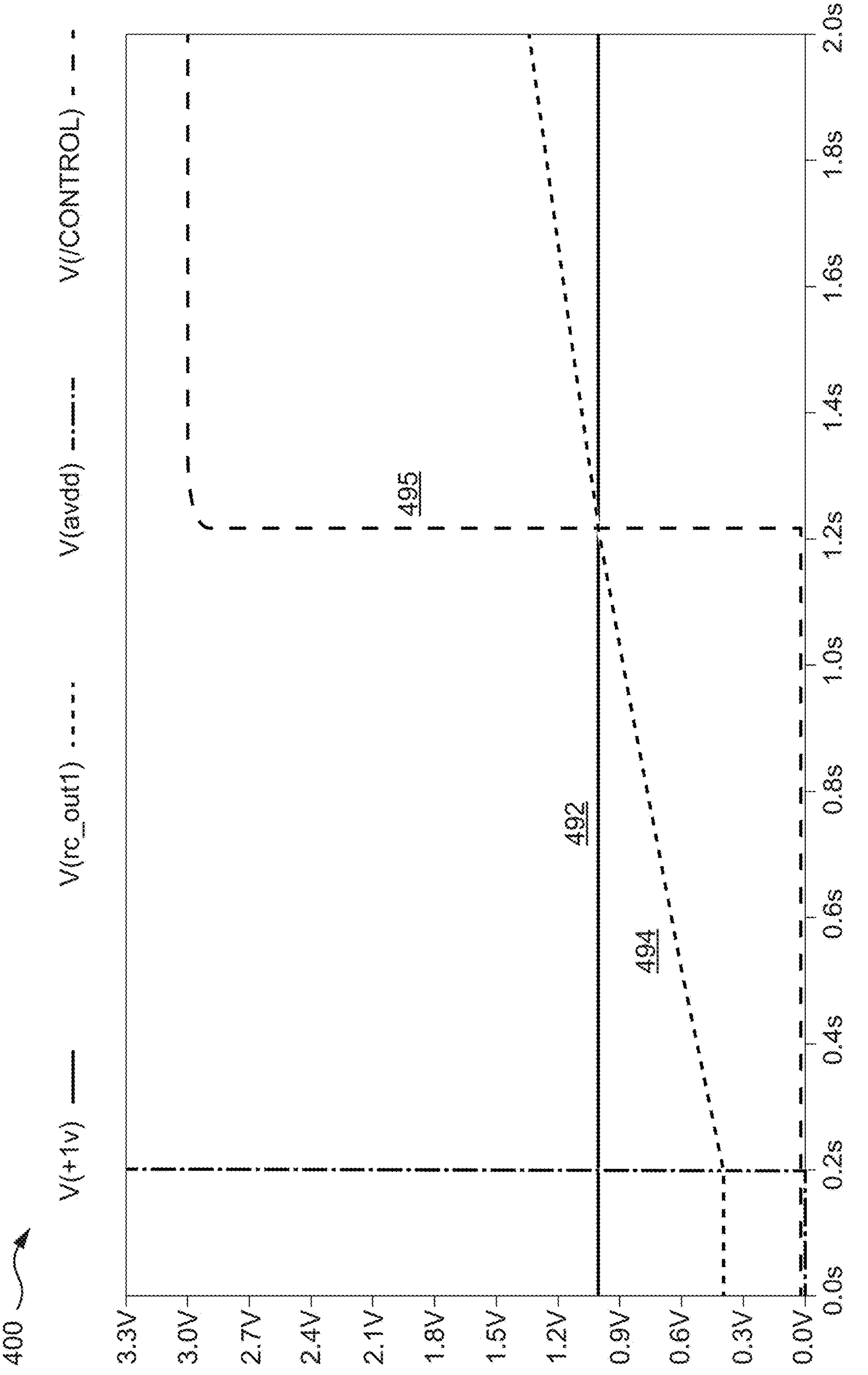
FIG. 4 depicts an exemplary transient response simulation of a control signal, according to one or more aspects.

FIG. 4 depicts an exemplary transient response simulation 400 of a control signal, according to one or more aspects. The transient response simulation 400 may be in a form of a graph having an x-axis representing time (e.g., seconds) and a y-axis representing a control signal voltage (V). The transient response simulation 400 corresponds to an exemplary simulation of how a control signal is changed from a low state to a high state based on operations of the timing circuitry 184 of the repeater circuitry 180, in accordance with the medical system 100, the electrical schematic 200, and various steps of the method 300. The transient response simulation 400 shows a transient response simulation of a control signal 495 in response to a comparison between a delay signal 494 and a linearly regulated signal 492.

In the simulation 400, the control signal 495, the delay signal 494, and the linearly regulated signal 492 behave correspondingly as described with respect to the control signal 195, the delay signal 194, and the linearly regulated signal 192, and described in detail with reference to FIG. 2. For example, upon electrical and/or data connection between the processor 162 and the imaging device 125 (e.g., corresponding to 0 seconds(S) on the x-axis), the control signal 495 may initially be in the low state (e.g., corresponding to 0 V). The linearly regulated signal 492 may be set to approximately 1 V (e.g., 1 V being the predetermined voltage level threshold), and the delay signal 494 (e.g., a RC delay signal) may be tied to approximately a 3.3 V signal. The delay signal 494 may be configured to rise from approximately 0.4 V to 3.3 V. Once the delay signal 494 reaches approximately 1 V, the control signal 495 may be changed from the low state (e.g., 0 V) to the high state (e.g., approximately 3 V). In the simulation 400, the delay signal 494 may take approximately 1.2 seconds to reach approximately 1 V.

As described according to one or more aspects of this disclosure, the repeater circuitry 180 as discussed herein may be configured to help maintain signal quality and strength of data signals transmitted between components of the medical imaging systems and devices discussed above. For example, the repeater circuitry 180 may be configured to amplify (e.g., enhance and/or strengthen) data signals generated by the imaging device 125, and transmit the amplified data signals to the processor 162 for processing to generate images and/or image streams for output to one or more displays of the medical system 100. Use of the repeater circuitry 180 to amplify the data signals may help to ensure quality image and/or images streams may be capable of being generated and displayed without having to use a shortened umbilicus and/or cables of a different material or diameter.

Further, the footprint of the repeater circuitry 180 is compact enough to be located within the handle 113 and within proximity to the processor 162, among other locations, which enables the repeater circuitry 180 to be included within the medical device 110 and also used with a wide array of medical devices and image processing devices. In some aspects, the repeater circuitry 180 may further be compact enough to be included at the connector 153, where the connector 153 serves as an interface to connect the medical device 110 to the image processing device 160. In further examples, the repeater circuitry 180 may be positioned at the image processing device 160, in proximity to the processor 162.

While principles of this disclosure are described herein with the reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, the invention is not to be considered as limited by the foregoing description.

What is claimed is:

1. A repeater circuitry, comprising:

timing circuitry configured to generate a control signal, a state of the control signal driving a first mode of operation or a second mode of operation for the repeater circuitry;

switching circuitry electrically connected to the timing circuitry and configured to:

receive the control signal from the timing circuitry;

based on the state of the control signal, cause the repeater circuitry to initially operate in the first mode; and transmit an initialization signal generated by and received from a processor to an imaging device while the repeater circuitry is operating in the first mode, wherein the imaging device is configured to generate one or more data signals in response to receiving the initialization signal; and buffer circuitry electrically connected to the switching circuitry, wherein, in response to the switching circuitry causing the repeater circuitry to subsequently operate in the second mode based on a change to the state of the control signal, the buffer circuitry is configured to receive and amplify the one or more data signals from the imaging device to generate one or more amplified data signals for transmission to the processor.

2. The repeater circuitry of claim 1, wherein the switching circuitry is electrically connected to the processor and configured to receive the one or more amplified data signals from the buffer circuitry and transmit the one or more amplified data signals to the processor while the repeater circuitry is operating in the second mode.

3. The repeater circuitry of claim 1, wherein the timing circuitry is further configured to:

compare a voltage level associated with a delay signal to a voltage level threshold; and when, based on the comparison, the voltage level associated with the delay signal is equal to or exceeds the voltage level threshold, change the state of the control signal.

4. The repeater circuitry of claim 3, wherein the voltage level threshold is based on a duration of time associated with the transmission of the initialization signal from the processor to the imaging device.

5. The repeater circuitry of claim 3, wherein the voltage level threshold is approximately 1 Volt (V) and the voltage level associated with the delay signal is configured to rise in voltage from approximately 0 V to approximately 3.3 V.

6. The repeater circuitry of claim 5, wherein a duration of time for the voltage level associated with the delay signal to meet or exceed the voltage level threshold ranges from approximately 1 second to approximately 1.2 seconds.

7. The repeater circuitry of claim 3, wherein the comparison is performed by a comparator of the timing circuitry.

8. The repeater circuitry of claim 1, wherein the imaging device is located at a distal end of a medical device.

9. The repeater circuitry of claim 1, wherein the first mode corresponds to a bidirectional mode of operation for data flow between the processor and the imaging device, and the second mode of operation corresponds to a unidirectional mode of operation for data flow from the imaging device to the processor for data transmission.

10. The repeater circuitry of claim 9, wherein in the bidirectional mode:

the initialization signal is transmitted from the processor to the switching circuitry along a first data path, and from the switching circuitry to the imaging device along a second data path, and wherein in the unidirectional mode:

the one or more data signals are transmitted from the imaging device to the buffer circuitry along a third data path; and the one or more amplified data signals are transmitted from the buffer circuitry to the switching circuitry along a fourth data path, and from the switching circuitry to the processor along the first data path.

11. The repeater circuitry of claim 9, wherein the buffer circuitry is bypassed in the bidirectional mode.

12. The repeater circuitry of claim 1, wherein the imaging device is located in a medical device and the processor is located at an image processing device, the image processing device being separate from the medical device.

13. The repeater circuitry of claim 12, wherein the repeater circuitry is located at a handle of the medical device.

14. The repeater circuitry of claim 12, wherein the repeater circuitry is located at a connector of the medical device, the connector configured to connect the medical device to the image processing device.

15. The repeater circuitry of claim 12, wherein the repeater circuitry is located more proximate to the processor than the imaging device along an electrical transmission path between the imaging device and the processor.

16. A medical system, comprising:

a medical device including an imaging device:

a processor configured to generate and transmit an initialization signal to the imaging device, wherein the imaging device is configured to generate one or more data signals in response to receiving the initialization signal; and repeater circuitry electrically connected between the processor and the imaging device, the repeater circuitry configured to operate in a first mode or a second mode, the repeater circuitry including:

timing circuitry configured to generate a control signal, a state of the control signal driving the first mode or the second mode for the repeater circuitry;

switching circuitry electrically connected to the timing circuitry and configured to:

receive the control signal from the timing circuitry;

based on the state of the control signal, cause the repeater circuitry to initially operate in the first mode; and transmit the initialization signal generated by and received from the processor to the imaging device while the repeater circuitry is operating in the first mode; and buffer circuitry electrically connected to the switching circuitry, wherein, in response to the switching circuitry causing the repeater circuitry to subsequently operate in the second mode based on a change to the state of the control signal, the buffer circuitry is configured to receive and amplify the one or more data signals from the imaging device to generate one or more amplified data signals for transmission to the processor.

17. The medical system of claim 16, wherein the timing circuitry is configured to cause the state of the control signal to change from a low state to a high state based on a comparison of a voltage level associated with a delay signal to a voltage level threshold.

18. The medical system of claim 17, wherein the voltage level threshold is based on a duration of time associated with the transmission of the initialization signal from the processor to the imaging device.

19. A method performed by repeater circuitry for amplifying one or more data signals, the method comprising:

transmitting an initialization signal received from a processor to an imaging device in a first mode of operation, wherein the imaging device is configured to generate one or more data signals in response to receiving the initialization signal;

comparing a voltage of a delay signal to a voltage level threshold to determine when to change a state of a control signal generated by the repeater circuitry from a low state to a high state;

switching a mode of operation of the repeater circuitry from the first mode to a second mode in response to the state of the control signal changing from the low state to the high state based on the comparison; and in the second mode of operation, receiving and amplifying the one or more data signals from the imaging device to generate one or more amplified data signals for transmission to the processor.

20. The method of claim 19, wherein the voltage level threshold is based on a duration of time associated with the transmission of the initialization signal from the processor to the imaging device.

* * * * *